US010897196B2

(12) United States Patent
Kärnä et al.

(10) Patent No.: US 10,897,196 B2
(45) Date of Patent: Jan. 19, 2021

(54) ARRANGEMENT AND METHOD FOR DELIVERING A CURRENT-CONTROLLED VOLTAGE

(71) Applicant: TactoTek Oy, Oulunsalo (FI)

(72) Inventors: Miikka Kärnä, Oulunsalo (FI); Tuomas Heikkilä, Oulunsalo (FI)

(73) Assignee: TACTOTEK OY, Oulunsalo (FI)

( * ) Notice: Subject to any disclaimer, the term of this patent is extended or adjusted under 35 U.S.C. 154(b) by 0 days.

(21) Appl. No.: 16/682,106

(22) Filed: Nov. 13, 2019

(65) Prior Publication Data

US 2020/0083806 A1  Mar. 12, 2020

Related U.S. Application Data

(63) Continuation of application No. 15/845,139, filed on Dec. 18, 2017, now Pat. No. 10,491,115.

(51) Int. Cl.
| | |
|---|---|
| *H02M 3/156* | (2006.01) |
| *G05F 1/67* | (2006.01) |
| *H02J 1/10* | (2006.01) |
| *H02M 7/217* | (2006.01) |
| *H02J 9/06* | (2006.01) |

(Continued)

(52) U.S. Cl.
CPC .......... *H02M 3/156* (2013.01); *G05F 1/445* (2013.01); *G05F 1/67* (2013.01); *H02J 1/10* (2013.01); *H02J 3/385* (2013.01); *H02J 9/061* (2013.01); *H02M 1/08* (2013.01); *H02M 7/217* (2013.01); *H05B 45/10* (2020.01); *H05B 45/395* (2020.01)

(58) Field of Classification Search
None
See application file for complete search history.

(56) References Cited

U.S. PATENT DOCUMENTS

| | | | |
|---|---|---|---|
| 8,975,831 B1 | 3/2015 | Szolusha et al. | |
| 2011/0285320 A1* | 11/2011 | Kustra | H05B 45/37 315/297 |

(Continued)

OTHER PUBLICATIONS

International Search Report issued by the European Patent Office in relation to International Application No. PCT/FI2018/050942 dated Feb. 25, 2019 (5 pages).

(Continued)

*Primary Examiner* — Jeffrey A Gblende
(74) *Attorney, Agent, or Firm* — Robert P. Michal, Esq.; Carter, DeLuca & Farrell LLP

(57) ABSTRACT

An arrangement involving printed conductive traces includes at least a voltage source ($V_{supply}$) and at least one target component, preferably a light-emitting component such as an LED. The arrangement is adapted to produce a current-controlled voltage ($V_{OUT2}$, $V_{out}$) originating from the voltage source, the current-controlled voltage being coupled to the at least one target component, wherein said voltage is dependent on the current ($I_{R,LED}$, $I_{LED}$) that is being passed through the target component and said voltage is adaptable to a varying resistance of the arrangement and its features.

6 Claims, 6 Drawing Sheets

(51) Int. Cl.
*G05F 1/445* (2006.01)
*H02M 1/08* (2006.01)
*H02J 3/38* (2006.01)
*H05B 45/10* (2020.01)
*H05B 45/395* (2020.01)

(56) References Cited

U.S. PATENT DOCUMENTS

| | | |
|---|---|---|
| 2012/0062147 A1 | 3/2012 | Fan |
| 2012/0188487 A1 | 7/2012 | Hagino et al. |
| 2013/0271034 A1* | 10/2013 | Tang .................... H05B 45/395 |
| | | 315/307 |
| 2013/0313974 A1 | 11/2013 | Fan et al. |
| 2014/0105610 A1 | 4/2014 | Azadeh |
| 2014/0292211 A1* | 10/2014 | Huang .................... H05B 45/00 |
| | | 315/161 |
| 2014/0354159 A1* | 12/2014 | Zhang .................... H05B 45/37 |
| | | 315/127 |
| 2014/0354186 A1 | 12/2014 | Sun et al. |
| 2015/0156834 A1* | 6/2015 | Capodivacca ......... H05B 45/46 |
| | | 315/294 |
| 2015/0373796 A1 | 12/2015 | Bahrehmand |
| 2016/0190927 A1 | 6/2016 | Tischler et al. |
| 2016/0353537 A1 | 12/2016 | Caldwell et al. |

OTHER PUBLICATIONS

Written Opinion of the International Searching Authority issued by the European Patent Office in relation to International Application No. PCT/FI2018/050942 dated Feb. 25, 2019 (9 pages).
Office Action issued by the United States Patent Office in relation to U.S. Appl. No. 15/845,139 dated Apr. 17, 2019 (11 pages).
Office Action issued by the United States Patent Office in relation to U.S. Appl. No. 15/845,139 dated Feb. 7, 2019 (10 pages).
Office Action issued by the United States Patent Office in relation to U.S. Appl. No. 15/845,139 dated Oct. 4, 2018 (10 pages).
Office Action issued by the United States Patent Office in relation to U.S. Appl. No. 15/845,139 dated Apr. 16, 2018 (13 pages).

* cited by examiner

ARRANGEMENT AND METHOD FOR DELIVERING A CURRENT-CONTROLLED VOLTAGE

CROSS-REFERENCE TO RELATED APPLICATIONS

This application is a continuation of U.S. application Ser. No. 15/845,139, filed Dec. 18, 2017 the entire disclosure of which is incorporated herein by reference.

TECHNICAL FIELD OF THE INVENTION

The invention is related to electronics in general. More specifically, the invention is related to an arrangement and method for delivering a current-controlled voltage.

BACKGROUND OF THE INVENTION

In many circumstances, it may be desirable to set the current being fed to a component to some specific value. For instance, in the case of light emitting diodes (LEDs) an LED driving circuit is generally constructed to deliver a predetermined current to the LED.

For components that may have a certain functionality that is dependent on current, it may also be desirable to change the current being fed to the component. It may be advantageous to be able to continuously alter the current being supplied to the component. In the aforementioned case of LEDs, for example a change in the brightness or intensity of the light emitted by the LED may be called for, in which case the current should be altered.

Typical circuits for driving LEDs, also those for which LED current should be adjustable, operate with fixed voltages. This voltage is selected to be high enough to be able to drive LEDs with a current that will lead to maximum intensity of the radiation emitted by the LED. Solutions with these high voltages are problematic because extra voltage will be converted to heat somewhere in the circuit, which is unpreferable. It has also been noticed in relation to LED matrices that excess voltage may cause challenges for software that is controlling the LEDs.

Printed electronics is also becoming more widespread and may replace the use of traditional printed circuit boards (PCBs) in many cases. With the inks in printed electronics that are used for printing conductive traces, the ink has a resistivity that will lead to voltage losses in the circuit, making driving LEDs in printed electronics more challenging than in the case of traditional PCBs. This voltage loss will vary with current and is difficult to take into account for instance due to inaccuracy in the printers, traces thus not possibly even being uniform. In addition to circumstances where a circuit should be designed to deliver an adjustable current to an LED, a circuit designer should be able to calculate or estimate the aforementioned voltage losses also for circuits with non-adjustable currents, as the power consumption of the LED may vary with time. It may be difficult or in practice impossible to estimate the effect of printed ink resistance and to design a circuit that will actually deliver a desired current to the LED.

In some cases circuits may be subject to conditions that lead to continuous adjustments of currents and/or voltages, as resistances in the circuit may vary with time. For example, stretching or straining of materials may occur during manufacture or during use of a product comprising a circuit that lead to varying resistances and voltage losses that may lead to unexpected or undesired behavior of the product either with time while in use or even directly after manufacturing, due to varying or unpredictable currents through target components.

SUMMARY OF THE INVENTION

A purpose of the invention is to alleviate at least some of the problems relating to the known prior art. In accordance with one aspect of the present invention, an arrangement involving printed conductive traces is provided, the arrangement comprising at least a voltage source and at least one target component, preferably a light-emitting component such as an LED. The arrangement is adapted to produce a current-controlled voltage originating from the voltage source, the current-controlled voltage being coupled to the at least one target component, wherein said voltage is dependent on the current that is being passed through the target component and said voltage is adaptable to a varying resistance of the arrangement and its features.

According to one other aspect, a method involving printed electronic traces for delivering a current-controlled voltage to at least one target component, preferably a light-emitting component such as an LED, is provided. The method comprises at least the steps of providing a target component, providing printed conductive traces, and providing a voltage source. The method additionally comprises steps of producing a current-controlled voltage that is dependent on a current that is being passed through the target component and is adaptable to a varying resistance of the arrangement and its features and coupling said current-controlled voltage to the target component.

Having regard to the utility of the present invention, according to an embodiment, the present invention may provide an arrangement and method for driving a target component, optionally a radiation emitting semiconductor element such as an LED, with a voltage that is sufficient for producing a target current but is not excessively high. This may be advantageous, as heating effects from excess voltage may be reduced. This gives an advantage over prior art solutions where a fixed, possibly excessively high voltage is used to drive LEDs or other such components.

In addition, the effect of resistance of printed inks may be taken into account effectively with embodiments of the invention. In cases where e.g. LED current should be increased, voltage losses associated with the printed ink will increase with increasing current. Through coupling a driving voltage to at least one target component that is dependent on the current that is being passed through the at least one target component, the current may be set to a desired or target value or the coupled voltage may be varied according to the current so that excessively high voltages may not have to be used. In doing so, the voltage losses in the circuit, from e.g. the resistance of printed ink traces, may be taken into account. The aforementioned voltage losses do not have to be estimated or calculated, which may save time and resources.

In one first embodiment of the invention, the LED current (or a current that is at least indicative of the LED current) is measured through a measuring circuit, and a first output voltage of the measuring circuit may be set according to the detected current, the first output voltage being coupled to a first transistor, the first transistor controlling an adjustment voltage of a voltage regulator circuit, with the voltage regulator circuit then producing a second output voltage that is then coupled to the at least one target component. Through such an arrangement, the measured current (which may be LED current) may be set to a desired value by varying the LED driving voltage.

In one other, second, embodiment of the invention, a transistor circuit is employed, and a base voltage of a transistor is controlled by a control voltage that may be set to a predetermined value. The emitter current of the transistor may be passed to the base of another transistor which, on the collector side may be coupled to the at least one target component and to the voltage source on the emitter side. Thus, if the current through the at least one target component is varied, the voltage that is fed to the target component will vary as well. The varying of the current passing through the target component may vary as the resistance of printed ink traces are varied, which e.g. may occur during use of the circuit.

In the exemplary embodiments presented herein, the invention is utilized for LEDs as target components. However, it is clear that the invention may be used in order to deliver a current-dependent voltage and/or means for adjusting a current to a certain value through altering a voltage being delivered with a feedback circuit configuration as depicted herein.

Various embodiments of the invention provide solutions that may be advantageous for different types of circuits involving one or more target components. For example, one embodiment of the invention may utilize a measuring circuit and a voltage regulator circuit and this embodiment may be convenient to use in the case of one or more single target components, such as LEDs, that may be connected in parallel.

On the other hand, in circuits involving LED matrices, a further embodiment of the invention may be utilized that may be a combination of other embodiments of an arrangement, with the outcome that this combined embodiment is more advantageous than the embodiments on their own, even though they would be applicable separately as well.

In one further embodiment, the two embodiments disclosed above may be used together in an arrangement involving LED matrices, in which case the portion of the arrangement comprising the measuring and voltage regulation circuits may serve to measure and regulate voltage that is being directed to the LED matrix as a whole, while another portion of the arrangement may comprising preferably a number of transistor circuits for giving current-controlled voltages that may serve as fine tuning for a single LED.

It is to be understood that an embodiment arrangement may comprise any number of the separate embodiments as portions or partial circuits, especially meaning that a first embodiment may be paired with one or more second embodiments to obtain a further embodiment of an arrangement which may be especially advantageous for some use scenarios.

An arrangement may be provided as separate components or an arrangement may be provided as or at least comprise an integrated system on a chip (SoC) or system on a package (SoP). Possible benefits gained from utilizing a SoC or SoP may be e.g. providing a high level of integration, low power consumption, and/or low space requirements.

Arrangements may provide methods to take into account environmental conditions, such as stretching or straining of materials that occurs during use. An arrangement may prolong the lifecycle of products that are susceptible to bending, as this bending may not lead to unwanted changes in current and thus, e.g. unwanted changes in LED brightness due to stretching of materials and a subsequent change in resistance. For instance, wearable products comprising printed electronics is an application where the invention may prove to be useful, as are products where a user is e.g. pressing on or otherwise exerting a force on the product.

In addition to the aforementioned straining of materials during use, the invention may provide improvements in manufacture of products where straining of materials may occur during manufacture. The end product may then provide a target current to one or more target components without having to take into account the changes in resistances that may occur due to the materials stretching.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

The previously presented considerations concerning the various embodiments of the arrangement may be flexibly applied to the embodiments of the method mutatis mutandis, and vice versa, as being appreciated by a skilled person.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
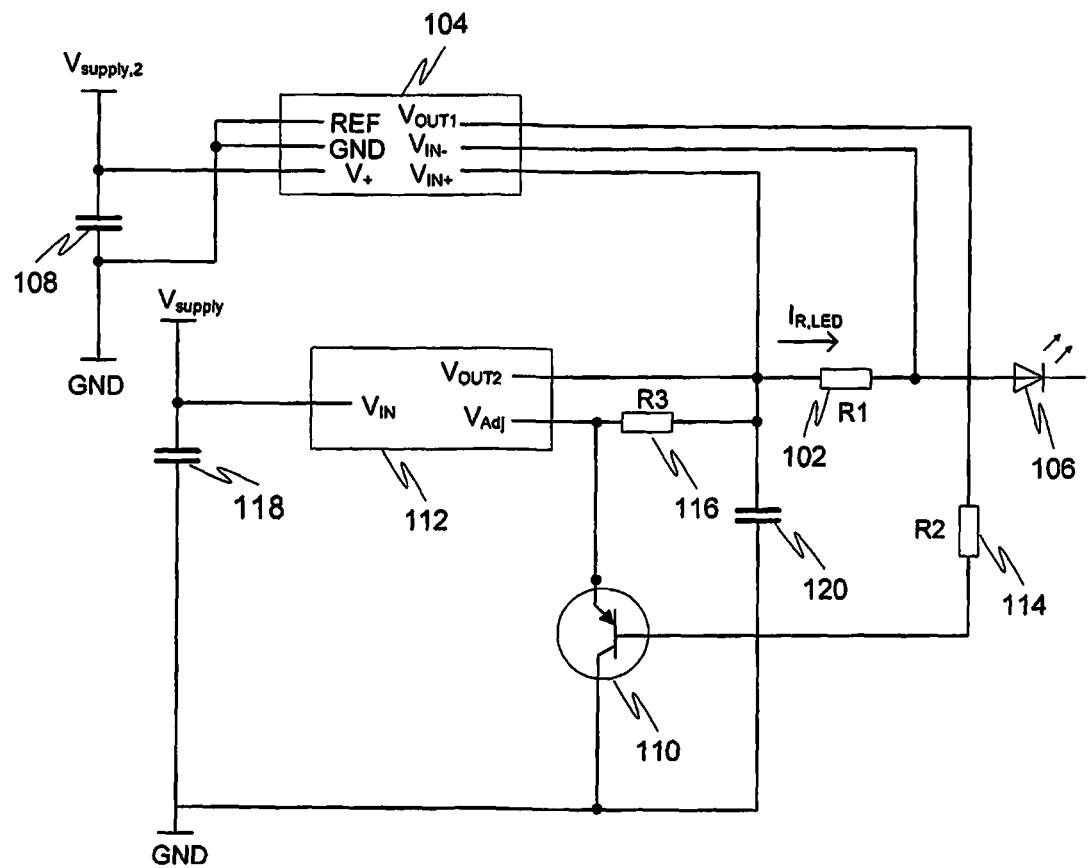
FIG. 1 illustrates an exemplary arrangement according to one embodiment of the invention, FIG. 2 gives a second exemplary arrangement according to one other embodiment of the invention, FIG. 3 gives a third exemplary arrangement according to a further embodiment of the invention.

In FIG. 1 an exemplary arrangement 100 is depicted. The conductive traces in embodiments of the arrangement 100, e.g. those depicted as lines in FIG. 1 that connect the various components comprised in an arrangement 100, may be printed traces comprising ink. Any of all of the traces in an arrangement 100 may be printed. For example, some of the traces may printed, while others are etched. A measurement circuit is configured to measure or detect a current and in FIG. 1, the measuring circuit comprises at least a first resistor 102 and a current sense amplifier 104. The first resistor R1 102 may be utilized as a current sense resistor to measure the current $I_{R,LED}$ passing through it, where the current $I_{R,LED}$ is the same current (or at least indicative of the current) that is passed through an LED 106. The component that the current $I_{R,LED}$ may pass through may also be any other current-operated device. The purpose of the arrangement 100 may be to deliver or produce an appropriate driving voltage to a target component, such as a radiation-emitting semiconductor element, e.g. LED, in order to have a desired current passing through the target component 106.

An arrangement 100 also comprises a voltage source, here a first power supply $V_{supply}$, that may be used to power the voltage regulation circuit and the target component 106. $V_{supply}$ may for instance be 12V.

The current $I_{R,LED}$ may be measured by measuring a voltage drop across the resistor R1 102, which may be carried out through the current sense amplifier 104. The current sense amplifier 104 may, for instance, be a common-mode zero-drift topology current-sensing amplifier such as an INA199-Q1 available from Texas Instruments Incorporated. The voltage drop across the first resistor 102 may be measured by detecting the voltages $V_{IN+}$ and $V_{IN-}$ by the current sense amplifier 104.

As may be comprehended by a skilled person, the current sense amplifier 104 may then produce a first output voltage $V_{out1}$ which is dependent on the sensed voltage drop (i.e. current). Such as with typically employed measurement circuits of the kind discussed here and involving the aforementioned current sense amplifier, the measurement circuit may additionally comprise a bypass capacitor 108 and a second power supply $V_{supply,2}$. The bypass capacitor may for instance have a capacitance of 100 nF and a second power supply $V_{supply,2}$ may e.g. supply a voltage of 5V that is utilized to power the current sense amplifier 104. The current sense amplifier 104 which is used in the embodiment of FIG. 1 comprises also a reference pin REF, a ground pin GND, and supply voltage pin V+.

This first output voltage $V_{out1}$ may then be delivered to a voltage regulation circuit. In the embodiment of FIG. 1, a voltage regulation circuit comprises at least a first transistor 110 and a voltage regulator 112. The voltage $V_{out1}$ may be delivered to the first transistor 110, which may be utilized to control the output voltage of the voltage regulator 112. The first transistor 110 may be a PNP bipolar silicon transistor such as BC857BLT1G and the voltage regulator 112 may be an adjustable low-dropout (LDO) regulator with a floating output, for example NCV317, both of which are available through Semiconductor Components Industries, LLC. The voltage regulator 112 may be powered by the voltage source $V_{supply}$ through the pin $V_{IN}$. The output voltage of the linear regulator, the second output voltage $V_{out2}$, will be dependent on the first output voltage $V_{out1}$ and thus, dependent on the current $I_{R,LED}$, as will be discussed below.

The voltage regulation circuit may additionally comprise a second resistor R2 114 and a third resistor R3 116, an input capacitor 118, and an output capacitor 120. The second resistor R2 114 may be configured to limit the current to the base of the first transistor 110 in order to deliver a small current to the base of the first transistor 110 in order to deliver such a current that may be used to control the transistor 110, as may be appreciated by a skilled person.

The third resistor R3 116, input capacitor 120, and output capacitor 122 may be comprised in a typical circuit configuration for an adjustable voltage regulator 112, the output voltage of which may be in a typical circuit controlled by the third resistor 116 and an adjustment resistor, which in such a typical circuit would reside in place of the transistor 110. An exemplary typical circuit involving a voltage regulator 112 may for instance be found in a datasheet for an NCV317 voltage regulator.

The voltage regulator 112 may be configured to keep a fixed voltage, such as 1.25 V, between the second output voltage $V_{OUT2}$ and the adjustment voltage $V_{adj}$. In a conventional use scenario (not involving a transistor), the second output voltage $V_{OUT2}$ may then be adjusted by adjusting the resistance of an adjustment resistor, for example by using a variable resistor.

Cleverly, in the embodiment of FIG. 1, the adjustment voltage $V_{adj}$ and thus the second output voltage $V_{OUT2}$ is altered, instead of using a variable resistor, by varying the impedance of the first transistor 110 through adjustment of its base current, which in turn is adjusted through $V_{OUT1}$.

If there is a need to increase the current to the target component 106, this may be achieved through increasing the second output voltage $V_{OUT2}$. Thus, as can be comprehended from the above and FIG. 1, the current $I_{R,LED}$ that is passed through the target component 106 may be set to a desired value or kept at a constant value despite varying voltage losses occurring in the circuit.

For instance, the current $I_{R,LED}$ may vary as the load or impedance of the circuit is changed. It may be understood that a variance occurring in the circuit materials may account for such a change and accordingly a change in the current. For example bending or stretching of materials comprised in the circuit may lead to said change in current. The change may be for instance gradual as the materials exhibit transformations progressively with use of the circuit.

From the circuit configuration of FIG. 1 the following may be derived:

$$V_{OUT2} - \Delta_{VOUT2,Vadj} - V_{eb,1} = V_{qb,1}, \quad (1)$$

where $\Delta_{VOUT2,Vadj}$ is the voltage between $V_{OUT2}$ and $V_{adj}$, which is here 1.25 V, $V_{eb,1}$ is the voltage between the emitter and base of the first transistor 110 (a saturation voltage of 0.7 V is used in this example), and $V_{qb,1}$ is the voltage between the collector and base of the first transistor 110, $$(V_{OUT1} - V_{qb,1})/R2 = I_{b,1}, \quad (2)$$

where $V_{OUT1} - V_{b,1}$ is the voltage difference between the first transistor 110 base and the first output voltage, R2 is the resistance of the second resistor 114, and $I_{b,1}$ is the current passing through the base of the first transistor 110. In this example, the resistance R2 is chosen to be 110 kΩ. Additionally, $$(\Delta_{VOUT2,Vadj}/R3)/H_{fe,1} = I_{b,1}, \quad (3)$$

where R3 is the resistance of the third resistor 116 (which is chosen as 124 Ω) and $H_{fe,1}$ is the current-gain of the first transistor 110. From equation (1), $$V_{OUT2} - 1.25V - 0.7V = V_{qb,1} \quad (4)$$

$$\rightarrow V_{OUT2} = V_{qb,1} + 1.95 \, V, \quad (5)$$

and from equation (2):

$$V_{qb,1} = V_{OUT1} + I_{b,1} * 100k\Omega \quad (6)$$

By combining (5) and (6) and inserting $I_b$ from (3):

$$V_{OUT2} = V_{OUT1} + 100 \text{ k}\Omega * ((1.25 \text{ V}/124 \, \Omega)/H_{fe,1}) + 1.95 \text{ V} = \quad (7)$$
$$V_{OUT1} + 1008/H_{fe,1} + 1.95 \text{ V}$$

The DC current gain of the first transistor 110 that has been mentioned here as BC857BLT1G by way of example, may in this case be taken as 200 A at 5V, giving:

$$V_{OUT2} = V_{OUT1} + 5.04V + 1.95V \quad (8)$$

$$\rightarrow V_{OUT2} = V_{OUT1} + 6.99V.$$

Thus, from (8) it can be seen that the second output voltage $V_{OUT2}$ will, with the components that are utilized in this example, be dependent only on the first output voltage $V_{OUT1}$ and, consequently, the detected current $I_{R,LED}$. Using an exemplary value of 5V for $V_{supply,2}$ here, in the case that the current $I_{R,LED}$ is at its maximum value, the first output voltage $V_{OUT1}$ may be 5V, leading to $V_{OUT2}$ reaching 11.99V. This is the theoretical maximum value for $V_{OUT2}$, in practice $V_{OUT2}$ may be smaller, as some voltage is converted to heat in the voltage regulator.

Figure 2:
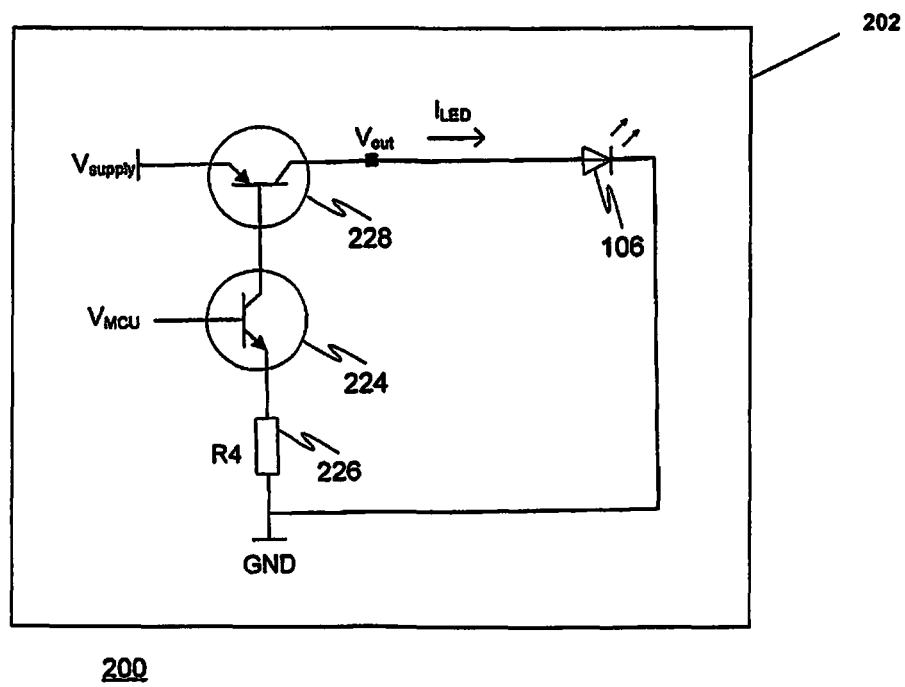

In FIG. 2, a second arrangement 200 is given according to one other embodiment of the invention. Also here (as with all embodiments of this invention), any or all of the traces may be printed ink traces. The second arrangement 200 comprises a target component 106, which is an LED, a voltage source $V_{supply}$, and a transistor circuit comprising a control voltage $V_{MCU}$, a second transistor 224, a fourth resistor R4 226, and a third transistor 228.

A control voltage $V_{MCU}$ may be delivered to the base of the second transistor 224, which may be may be an NPN bipolar silicon transistor such as BC846B. The control voltage $V_{MCU}$ may be set by a microcontroller unit (MCU). The control voltage $V_{MCU}$ may for example vary between 0V and 5V, and the control voltage may be set to a predetermined value.

The collector current of the second transistor 224 is passed to the base of the third transistor 228, which may be an PNP bipolar power transistor MJD210. The collector side of the third transistor 228 may be coupled to the target component 106, while the emitter side of the third transistor 228 is coupled to the voltage source $V_{IN}$.

Thus, the current passing to the base of the third transistor 228 is constant, and a change in the current $I_{LED}$ (for instance through a change in the resistance of materials comprised in the circuit) will lead to a change in the voltage that is drawn from the voltage source $V_{IN}$, which will then accordingly also change the voltage $V_{out}$, which is the voltage that may drive the target component 106.

The predetermined value of the control voltage along with the value of the fourth resistor 226 determine a maximum current that may be passed through the target component 106.

From the circuit configuration of FIG. 2, it may be derived that the current $I_{b,2}$ at the base of the second transistor 224 is $$I_{b,2}=(V_{MCU}-V_{bc,2})/R4, \quad (9)$$

where $V_{bc,2}$ is the voltage between the base and collector of the second transistor 224, and R4 is the resistance of the fourth resistor. The current passing through the second transistor, $I_{c,2}$, is $$I_{c,2}=I_{b,2}*H_{fe,2}, \quad (10)$$

where $H_{fe,2}$ is the current-gain of the second transistor 224, while the base current $I_{b,3}$ at the base of the third transistor 228 is $$I_{b,3}=I_{c,2}. \quad (11)$$

The maximum current $I_{LED,max}$ that may be passed through the target component 106 is then $$I_{LED,max}=H_{fe,3}*I_{b,3} \quad (12)$$

Through combining (9), (10), (11), and (12):

$$I_{LED,max}=H_{fe,3}*H_{fe,2}*(V_{MCU}-V_{bc,2})/R4. \quad (13)$$

The voltage $V_{out}$ that is being delivered to the target component 106 is $$V_{out}=V_{f,LED}*I_{LED}, \quad (14)$$

where $V_{f,LED}$ is the forward voltage of the LED 106. Thus, there is produced a current-controlled voltage that is coupled to the target component 106.

It may be noted that the embodiment of FIG. 2 may also be used for other purposes such as a high-side switch.

Figure 3:
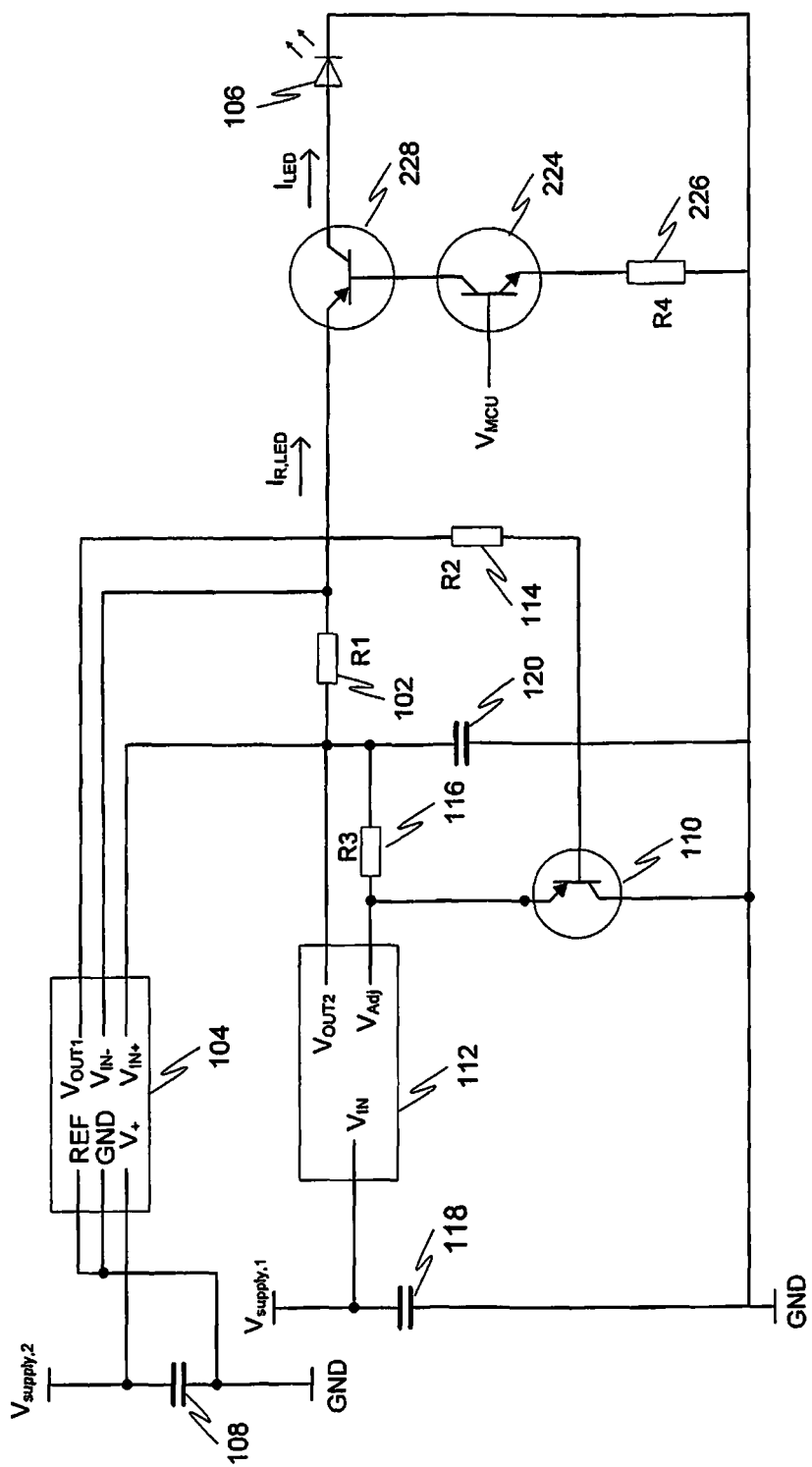

In FIG. 3, a third arrangement 300 is given according to a further embodiment of the invention. The third arrangement 300 may constitute a combination embodiment that comprises at least parts of the arrangement 100 and the second arrangement 200 and at least some of the functionalities of both said arrangements. The third arrangement 300 of FIG. 3 comprises a measurement circuit and a voltage regulation circuit as disclosed in connection to the arrangement 100 of FIG. 1 and additionally a transistor circuit disclosed in connection to the second arrangement 200 of FIG. 2.

The components and partial circuits in FIG. 3 function as disclosed previously, with the distinction that the measuring circuit now measures a current $I_{R,LED}$ that may not directly be the current that is passing through a target component 106, but is indicative of it. The voltage regulation circuit now produces a voltage $V_{OUT2}$ that will act as a voltage source for the rest of the circuit that is essentially equivalent to the second arrangement 200 in FIG. 2. The partial circuit that corresponds to the second arrangement 200 may then be used to vary the voltage $V_{OUT2}$ in order to for instance account for a change that may occur in the current $I_{LED}$, which is the current that is being passed through a target component 106.

Further embodiments may comprise a measuring circuit and voltage regulation circuit as disclosed above, and a plurality of transistor circuits that may each be coupled to a target component 106, the arrangement then comprising a plurality of target components 106. In these embodiments, the current $I_{R,LED}$ may be a current that is being passed to an LED matrix. Each of the LEDs in the matrix may then be associated with a transistor circuit each comprising a current $I_{LED}$ that may then be a current that is being passed through each of the target components 106, thus providing a method of fine-tuning the current through each target component 106. In an embodiment, the number of transistor circuits that may be used or required in connection with an LED matrix may depend, for instance, on the number of rows and/or columns that the LED matrix is configured to comprise.

Figure 4:
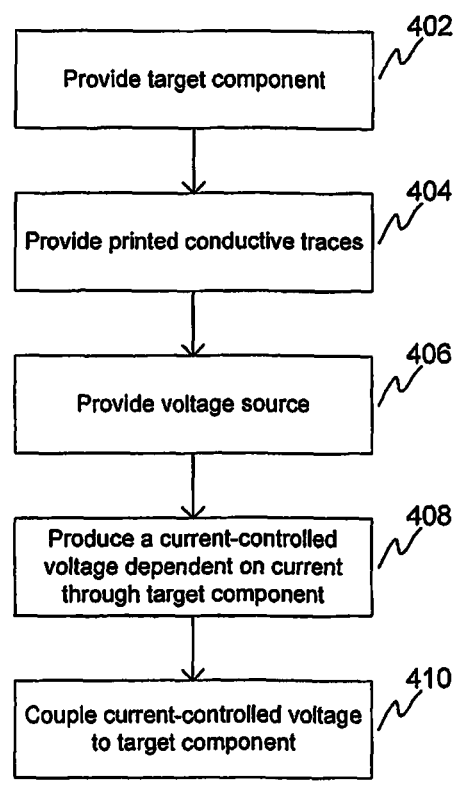
FIG. 4 illustrates steps that may be performed in a method according to an embodiment of the invention, FIG. 5 gives further steps that may be performed in one other method according to an embodiment of the invention, and FIG. 6 gives further steps that may be performed in yet one other method according to an embodiment of the invention.

FIG. 4 illustrates steps that may be taken in a method according to the present invention. A (at least one) target component 106 is provided 402, printed conductive traces are provided 404, and a voltage source $V_{supply}$ is provided 406. At 408, a current-controlled voltage that is dependent on a current through the target component 106 is produced, while at 410, the produced current-controlled voltage is coupled to the target component 106.

Figure 5:
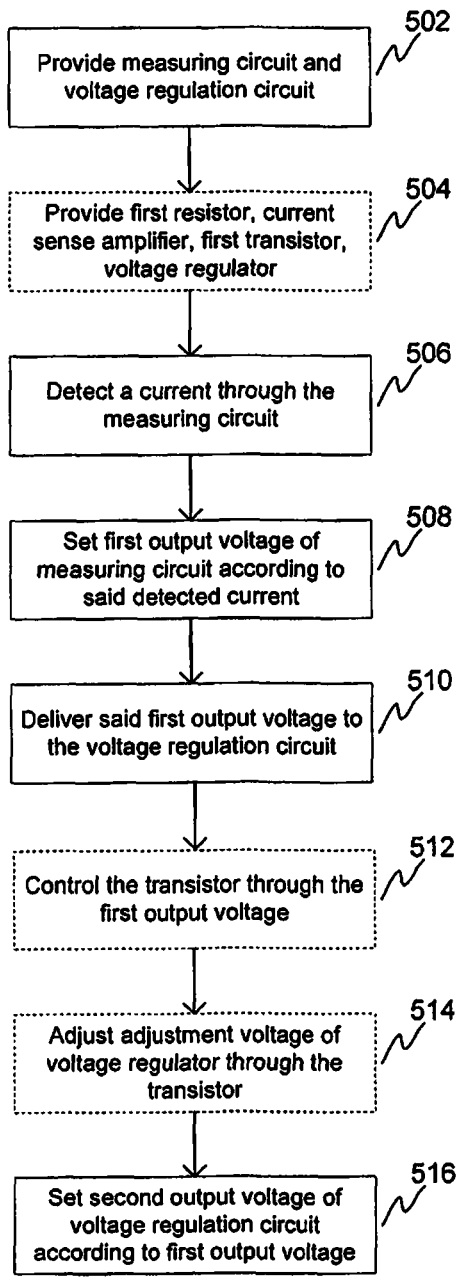

FIG. 5 shows further steps that may be taken in one other method according to an embodiment of the present invention. In 502 a measuring circuit and voltage regulation circuit are provided. Step 504 involves providing a first resistor 102 and current sense amplifier 104, which are to be comprised in the measuring circuit. Still at 504, a first transistor 110, such as a PNP transistor, and voltage regulator 112 are further provided and are to be comprised in the voltage regulator circuit. The steps of providing a target component 106, printed conductive traces, and a voltage source $V_{supply}$ are omitted in FIG. 5.

At 506 a current is detected through utilizing the measuring circuit. A current $I_{R,LED}$ which is passed through the first resistor and may be passed through the target component 106 is detected with the current sense amplifier 104, after which a first output voltage of the measuring circuit (here the first output voltage $V_{OUT1}$ of the current sense amplifier 104) is set according to the detected current in 508.

At step 510, the first output voltage $V_{OUT1}$ is delivered to the voltage regulation circuit. At 512, the delivered first output voltage is used to control the first transistor 110, while the first transistor 110 is used in 514 to adjust the adjustment voltage $V_{adj}$ of the voltage regulator 112. At 516, a second output voltage of the voltage regulation circuit ($V_{OUT2}$ here in the exemplary embodiment, which will vary with $V_{adj}$) is set (or produced) according to the first output voltage. As is easily comprehended by what is disclosed above relating to FIG. 1, this second output voltage will be dependent on the detected current and is thus the current-controlled voltage that is coupled to the target component 106.

Figure 6:
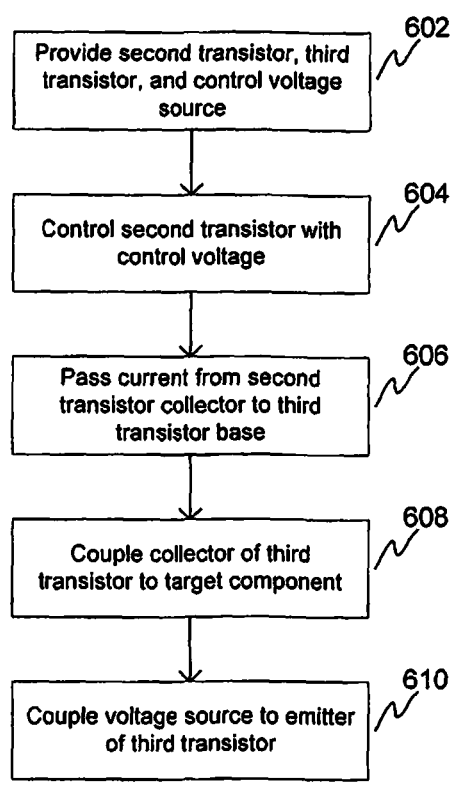

In FIG. 6, further steps that may be taken in yet one other embodiment of the invention are shown. A second transistor 224 such as a PNP transistor, third transistor 228 such as an NPN transistor, and control voltage source $V_{MCU}$ are provided 602 (in addition to providing a target component 106, printed conductive traces, and a voltage source $V_{supply}$, which are omitted in FIG. 6). The second transistor 224 is controlled 604 with the control voltage source through the base of the second transistor. At 606, a current is passed from the collector of the second transistor 224 to the base of the third transistor 228. The collector of the third transistor 228 is coupled 608 to the target component 106, while at 610, the emitter of the third transistor 228 is coupled to the voltage source.

The invention has been explained above with reference to the aforementioned embodiments, and several advantages of the invention have been demonstrated. It is clear that the invention is not only restricted to these embodiments, but comprises all possible embodiments within the spirit and scope of inventive thought and the following patent claims.

The features recited in dependent claims are mutually freely combinable unless otherwise explicitly stated.

The invention claimed is:

1. An arrangement including printed conductive traces, the arrangement comprising:
    a first voltage source ($V_{supply}$);
    a current sense amplifier configured to produce a first output voltage;
    at least one target component, the arrangement being configured to produce a current-controlled voltage ($V_{OUT2}$, $V_{out}$) originating from the first voltage source, the current-controlled voltage being coupled to the at least one target component, wherein said current-controlled voltage of the first voltage source is varied in response to a change in the first output voltage of the current sense amplifier, such that the current-controlled voltage is dependent on a current ($I_{R,LED}$, $I_{LED}$) that is being passed through the at least one target component; and
    at least one of each of a measuring circuit and a voltage regulation circuit, wherein the measuring circuit is configured to detect a current ($I_{R,LED}$) that is at least indicative of the current being passed through the at least one target component, wherein the measuring circuit is additionally configured to control the voltage regulation circuit to produce a second output voltage ($V_{OUT2}$) that is dependent on said detected current, the second output voltage ($V_{OUT2}$) being the produced current-controlled voltage that is coupled to the target component, wherein the target component comprises at least one LED, wherein the measuring circuit comprises at least the current sense amplifier and a first resistor and the voltage regulation circuit comprises at least a first transistor and a voltage regulator, wherein the current sense amplifier is configured to detect a current passed through the first resistor, which is the current ($I_{R,LED}$) that is at least indicative of the current being passed through the at least one target component, with the first output voltage ($V_{OUT1}$) of the current sense amplifier being dependent on said detected current, said first output voltage controlling the first transistor by the first output voltage being lead to a base of the first transistor, and the first transistor controlling the second output voltage ($V_{OUT2}$) of the voltage regulator by an impedance of the first transistor determining the second output voltage through adjusting an adjustment voltage ($V_{adj}$) of the voltage regulator, the second output voltage being the produced current-controlled voltage that is coupled to the at least one target component.

2. The arrangement of claim 1, wherein the arrangement additionally comprises at least one transistor circuit, the transistor circuit comprising at least a second transistor, a third transistor, and a control voltage source ($V_{MCU}$), wherein the arrangement is configured to control the second transistor with a voltage produced by the control voltage source being lead to a base of the second transistor, a collector current of the second transistor being passed to a base of the third transistor, an emitter of which is coupled to the first voltage source, while a collector of the third transistor is coupled to the at least one target component, and the current-controlled voltage ($V_{out}$) is thus delivered to the at least one target component.

3. The arrangement of claim 1, wherein the arrangement is configured to adjust the produced current-controlled voltage in order to attain a target value of the current being passed through the at least one target component.

4. The arrangement of claim 1, wherein the arrangement is provided as or at least comprises an integrated system on a chip (SoC) or system on a package (SoP).

5. A method for delivering a current-controlled voltage to at least one target component, the method comprising at least the steps of:
    providing a target component,
    providing printed conductive traces,
    providing a first voltage source ($V_{supply}$),
    providing a current sense amplifier configured to produce a first output voltage,
    producing a current-controlled voltage ($V_{OUT2}$, $V_{out}$) from the first voltage source, wherein the current-controlled voltage of the first voltage source is varied in response to a change in the first output voltage of the current sense amplifier, such that the current-controlled voltage is dependent on a current ($I_{R,LED}$, $I_{LED}$) that is being passed through the target component,
    coupling said current-controlled voltage to the target component,
    providing a measuring circuit and a voltage regulation circuit and detecting a current ($I_{R,LED}$) with the measuring circuit, the current being at least indicative of the current that is being passed through the target component, wherein producing the current-controlled voltage comprises steps of:

setting the first output voltage ($V_{OUT1}$) according to said detected current, delivering said first output voltage to the voltage regulation circuit, setting a second output voltage ($V_{OUT2}$) of the voltage regulation circuit according to said first output voltage, and coupling said second output voltage to the target component, wherein the target component comprises at least one LED, providing a first resistor to be comprised in the measurement circuit, providing the current sense amplifier to be comprised in the measurement circuit, providing a first transistor to be comprised in the voltage regulation circuit, providing a voltage regulator to be comprised in the voltage regulation circuit, wherein the detecting of the current is carried out through the first resistor and the current sense amplifier and the first output voltage is provided by the current sense amplifier, controlling the first transistor through the first output voltage, adjusting the adjustment voltage of the voltage regulator through the first transistor, and producing, with the voltage regulator, the second output voltage that is coupled to the target component, the second output voltage being dependent on the detected current.

6. The method of claim 5, wherein the method additionally comprises steps of:

providing a second transistor, providing a third transistor, providing a control voltage source ($V_{MCU}$), controlling the second transistor with a voltage produced by the control voltage source by leading the voltage to the base of the second transistor, passing a collector current of the second transistor to a base of the third transistor, coupling a collector of the third transistor to the target component, and coupling the first voltage source to an emitter of the third transistor.

\* \* \* \* \*